United States Patent
Suominen

(10) Patent No.: US 9,626,676 B2
(45) Date of Patent: Apr. 18, 2017

(54) SECURED ONLINE TRANSACTIONS

(71) Applicant: F-Secure Corporation, Helsinki (FI)

(72) Inventor: Mikko Suominen, Oulainen (FI)

(73) Assignee: F-Secure Corporation, Helsinki (FI)

( * ) Notice: Subject to any disclaimer, the term of this patent is extended or adjusted under 35 U.S.C. 154(b) by 427 days.

(21) Appl. No.: 14/220,522

(22) Filed: Mar. 20, 2014

(65) Prior Publication Data

US 2014/0289127 A1 Sep. 25, 2014

(30) Foreign Application Priority Data

Mar. 22, 2013 (GB) .................................. 1305295.6

(51) Int. Cl.
G06F 21/00 (2013.01)
G06Q 20/38 (2012.01)
G06Q 20/32 (2012.01)

(52) U.S. Cl.
CPC ........... G06Q 20/382 (2013.01); G06Q 20/32 (2013.01)

(58) Field of Classification Search
CPC combination set(s) only.
See application file for complete search history.

(56) References Cited

U.S. PATENT DOCUMENTS

2008/0172746 A1* 7/2008 Lotter .................. G06F 21/552
726/26

FOREIGN PATENT DOCUMENTS

| GB | 2430335 A | 3/2007 |
| JP | 2003099273 A | 4/2003 |
| JP | 2009169491 A | 7/2009 |
| WO | WO-2007/038896 A2 | 4/2007 |
| WO | WO 2009/083999 | * 7/2009 |

* cited by examiner

Primary Examiner — Ghazal Shehni
(74) Attorney, Agent, or Firm — Harrington & Smith

(57) ABSTRACT

A method, apparatus, and computer program for improving security in connection with online transactions are provided. A security application configured to monitor received text messages of a short message service is executed in an apparatus. The security application is arranged to have prioritized access to process the received text messages before other applications executed in the apparatus, to identify from contents of a received text message whether or not the received text message includes a transaction authentication message and, upon detecting that the received text message includes the transaction authentication message, prevent the processing of the transaction authentication message by the other applications and carry out user interfacing related to the transaction authentication message within a secured environment provided by the security application.

19 Claims, 3 Drawing Sheets

SECURED ONLINE TRANSACTIONS

FIELD

The invention relates to the field of online transactions where a transaction is verified by double authentication.

BACKGROUND

Secured online transactions may comprise two authentication steps before a transaction is executed. Such authentication is conventionally used in online banking transactions, for example. A user may be requested to input a specific password in connection with accepting the transaction in his/her online bank account. The second authentication may be in the form of a mobile transaction authentication. When the user has initiated the transaction, a transaction authentication number (TAN) is generated by the bank and sent to the user's mobile phone by a short messaging service (SMS) message. The SMS message may also include transaction data allowing the user to verify that the transaction has not been modified in the transmission. Upon receiving the verification from the user via the SMS, the transaction may be executed.

Even such a dual-step authentication is prone to malicious software An example of such a malicious software comprises one software component infecting the user's home computer and another infecting the user's the mobile phone. The software component in the user's home computer may capture the user's banking password and initiate a fraudulent transaction without the user noticing it. Once the SMS has been delivered to the mobile phone, the software component on the mobile phone intercepts the SMS and verifies the transaction without the user ever noticing.

BRIEF DESCRIPTION

According to an aspect, there is provided a method comprising: executing, in a mobile communication device, a security application configured to monitor received text messages of a short message service; arranging, in the mobile communication device, the security application to have prioritized access to process the received text messages before other applications executed in the mobile communication device; identifying, in the mobile communication device from contents of a received text message, whether or not the received text message comprises a transaction authentication message; upon detecting that the received text message comprises the transaction authentication message, preventing in the mobile communication device the processing of the transaction authentication message by the other applications and carrying out user interfacing related to the transaction authentication message within a secured environment provided by the security application.

According to another aspect, there is provided an apparatus comprising at least one processor and at least one memory including a computer program code, wherein the at least one memory and the computer program code are configured, with the at least one processor, to cause the apparatus to: execute a security application configured to monitor received text messages of a short message service; arrange the security application to have prioritized access to process the received text messages before other applications executed in the apparatus; identify from contents of a received text message whether or not the received text message comprises a transaction authentication message; upon detecting that the received text message comprises the transaction authentication message, prevent the processing of the transaction authentication message by the other applications and carry out user interfacing related to the transaction authentication message within a secured environment provided by the security application.

According to another aspect, there is provided a computer program product embodied on a non-transitory distribution medium readable by a computer and comprising program instructions which, when loaded into the computer, execute a computer process comprising: executing a security application configured to monitor received text messages of a short message service; arranging the security application to have prioritized access to process the received text messages before other applications executed in the mobile communication device; identifying from contents of a received text message, whether or not the received text message comprises a transaction authentication message; upon detecting that the received text message comprises the transaction authentication message, preventing the processing of the transaction authentication message by the other applications and carrying out user interfacing related to the transaction authentication message within a secured environment provided by the security application. Embodiments of the invention are defined in the dependent claims.

LIST OF DRAWINGS

Embodiments of the present invention are described below, by way of example only, with reference to the accompanying drawings, in which FIG. 1 illustrates a computer environment to which some embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
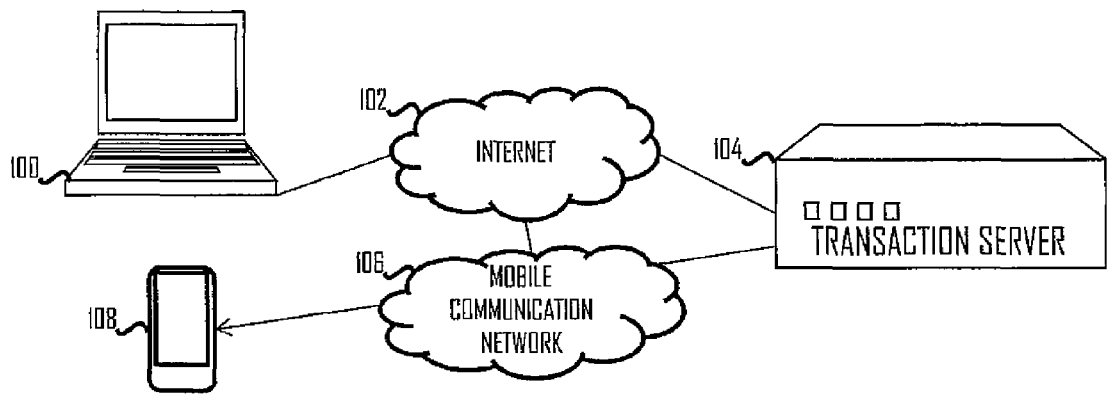

FIG. 1 illustrates a computer environment to which embodiments of the invention may be applied. Referring to FIG. 1, a user may operate his/her computer 100 to carry out transactions, e.g. bank transactions over online banking provided by virtually all banks. The bank transactions are conducted over the Internet by accessing a server computer of the entity executing the transaction, e.g. the bank. The server computer is illustrated in FIG. 1 by a transaction server 104. Banks set requirements for authorizing the transactions in order to prevent fraudulent transactions. The user may be provided with one or more personal transaction authentication numbers (TAN), and one of the TANs may be used to authorize one transaction. After that, the particular TAN is no longer usable and another TAN needs to be used for authorizing a further transaction.

Many banks use the dual-step authentication mentioned in the Background section. Several methods for carrying out the additional authentication may be used, and some examples are described herein. In one example, the transaction server 104 sends a short messaging service (SMS) text message to a mobile telephone number registered to the user in a user account stored in the transaction server 104. The text message may be considered as a transaction authentication message transmitted from the transaction server 104 to the user's mobile communication device 108 via a mobile communication network 106, e.g. a cellular communication network. The mobile communication device 108 may be a mobile phone, a smart phone, a tablet computer, or a terminal device of a mobile communication system. The transaction authentication message may comprise at least some details of the transaction enabling the user to recognize the transaction. The details may comprise a sum being transferred, a portion of a destination bank account number. The transaction authentication message may additionally comprise instructions for the user with respect to carrying out the authentication. The transaction authentication message may comprise instructions for the user how to reply to the text message, e.g. instructions to reply to the transaction authentication message with a message consisting of a certain character or a character string, e.g. "A". In another embodiment, the transaction authentication message comprises a mobile TAN, and the user is instructed to provide verification to the mobile TAN via the computer 100. The verification may be a number string associated with the mobile TAN provided to the user beforehand, e.g. in connection with the TANs. Upon inputting the correct verification over the computer 100, the transaction is authenticated, and the transaction server 104 may proceed to carry out the transaction. The mobile TAN may expire after a determined time interval from the transmission of the mobile TAN, and the user may need to request for another mobile TAN in that case.

Figure 2:
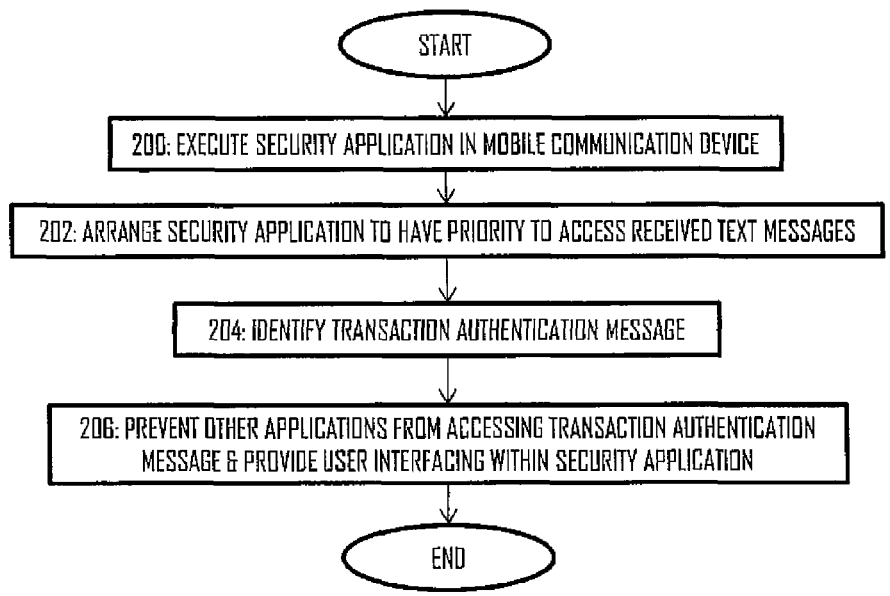
FIG. 2 is a flow diagram of a process for securing transaction authentications according to an embodiment of the invention.

As mentioned above, some malicious software infecting the mobile communication devices 108 scan the received text messages and intercept said transaction authentication message and authorize the transactions without the user ever noticing the reception of the transaction authentication message. Embodiments of the invention may be applied to a security application installed to the mobile communication device 108. FIG. 2 illustrates a flow diagram of a process for using the security application to secure the mobile transaction authentications and, in general, online transactions carried out by using the mobile communication device 108. The process of FIG. 2 may be carried out as a computer process executed by a processor comprised in or applicable to the mobile communication device 108. The parameters of the computer process may be defined by a computer program readable by the processor and stored in a memory.

Referring to FIG. 2, the security application is executed in the mobile communication device 108 in block 200. The security application is configured to monitor received text messages of a short message service (SMS). In block 202, the security application is arranged to have prioritized access to process the received text messages before other applications executed in the mobile communication device. Below, some embodiments for carrying out block 202 are described. In block 204, the security application identifies from contents of a received text message whether or not the received text message comprises a transaction authentication message. The transaction authentication message may have above-described characteristics distinguishing it from the other text messages. Upon detecting that the received text message comprises the transaction authentication message, block 206 is carried out. Block 206 comprises preventing the other applications of the mobile communication device from processing the transaction authentication message. Block 206 further comprises carrying out user interfacing related to the transaction authentication message within a secured environment provided by the security application.

The embodiment of FIG. 2 thus effectively detects the transaction authentication message as a first application executed in the mobile communication device 108, provided by block 202. As a consequence, the security application gains access to the received text messages before any other application, including any malicious applications or applications infected by malicious software. Upon detecting the transaction authentication message, the security application may isolate the transaction authentication message from other text messages such that the other applications will not gain access to the transaction authentication message. The isolation may comprise said carrying out user interaction related to the transaction authentication message within the security application. The user interaction may comprise the security application at least one of displaying contents of the transaction authentication message to the user, receiving a user input to reply to the transaction authentication message and, upon receiving the user input, causing transmission of a reply to the transaction authentication message.

With respect to block 202, let us now consider some embodiments for arranging the highest priority for the security application to gain access to the received text messages. Different embodiments described below may be applied to different operating systems of mobile communication devices. The operating system provided in the mobile communication device 108 may be iOS® by Apple Inc.®, Windows Phone by Microsoft®, Blackberry OS, Symbian®, or a Linux-based operating system such as Android®, MeeGo, Tizen, or Sailfish, for example. It should be appreciated that the security application may be designed for any operating system operating in mobile communication devices. Some systems may provide different priority levels for the applications, and the priority levels may be applied to the access to the received text messages. For example, in the Android® a base class software module handling the monitoring of the received text messages is called "Broadcastreceiver", and this module applies the priorities. When installing the security application, installation parameters of the security application may define the highest priority for the security application in the software module handling the processing of the received text messages.

Some operating systems allow access to the received text messages in an alphabetical order of the applications. When installed to such an operating system using the alphabetical order, the installation parameters of the security application may define for the security application a name that has a very high probability of being first in the alphabetical order. This may be ensured by providing a name that starts with "A" or a sequence of "A's". In order to further improve the probability of being first in the alphabetical order, the security application may be provided with a name beginning with a character that precedes the letters in a sorting logic of the operating system, e.g. an underscore "_" or a number. The whole name or at least the first one or more characters of the application may appear artificial in the sense that it does not describe the application, and the point is only to ensure that the application is the first in the alphabetical order or according to some other sorting logic or combinations thereof (e.g. numerical or chronological order, radical-and-stroke sorting for non-alphabetic writing systems, other collation techniques). This feature may also be used in another embodiment where the security application may check, during or after the installation, whether or not one or more applications precede the security application in the alphabetical order or according to any other sorting logic. Since the name of the security application itself has been designed to artificially place the security application first in the alphabetical order, any other application preceding it in the alphabetical order most likely have the same purpose. Therefore, they may be considered as suspicious applications, and the security application may scan the applications for a potential maliciousness. The security application may request uninstallation of such applications, particularly if they have been found to be suspicious in the scanning. After the installation of the security application, the security application may be configured to monitor the applications being installed to the mobile communication device. If an application being installed is placed before the security application in the alphabetical order, the security application may prevent installation of the application or alert the user of potentially malicious software being installed.

In some embodiments where the security application may choose the name of the application during its installation, the list of installed applications may be checked and the name of the application may be selected such that it becomes the first in the alphabetical order of installed applications.

Some operating systems may use installation order as a deciding factor for sorting the applications that have access to the received text messages. The installation order may be used in connection with the alphabetical order. The operating system may use the alphabetical order for applications that have been previously installed. When a new application is installed to the mobile communication device, the new application may be placed as the last application to gain access to the received text messages because of its latest installation date/time. After a reboot, the new application is taken into the alphabetical order among the other applications. The security application designed for such systems may request for a reboot of the mobile communication device after the installation in order to ensure that it is effectively in use right after the installation.

Another factor affecting the processing order in some operating systems is the order in which the monitoring applications have been started, either the first or last application to start is the one that will be the first to receive incoming text messages. In an embodiment, the security application is arranged during the installation phase to have the first or the last turn to start when the mobile communication device is booted. Whether the security application is arranged to get the first or the last turn in the starting order may depend on the operating system and how the operating system sorts the applications with respect to accessing the received text messages. Accordingly, the security application acquires the first access to the received text messages.

In yet another embodiment utilizing cooperation between the operating system and the security application, the operating system recognizes security applications and provides the security application with the highest priority to access the received text messages. The operating system may recognize the security application on the basis of a digital signature of the security application, for example.

Figure 3:
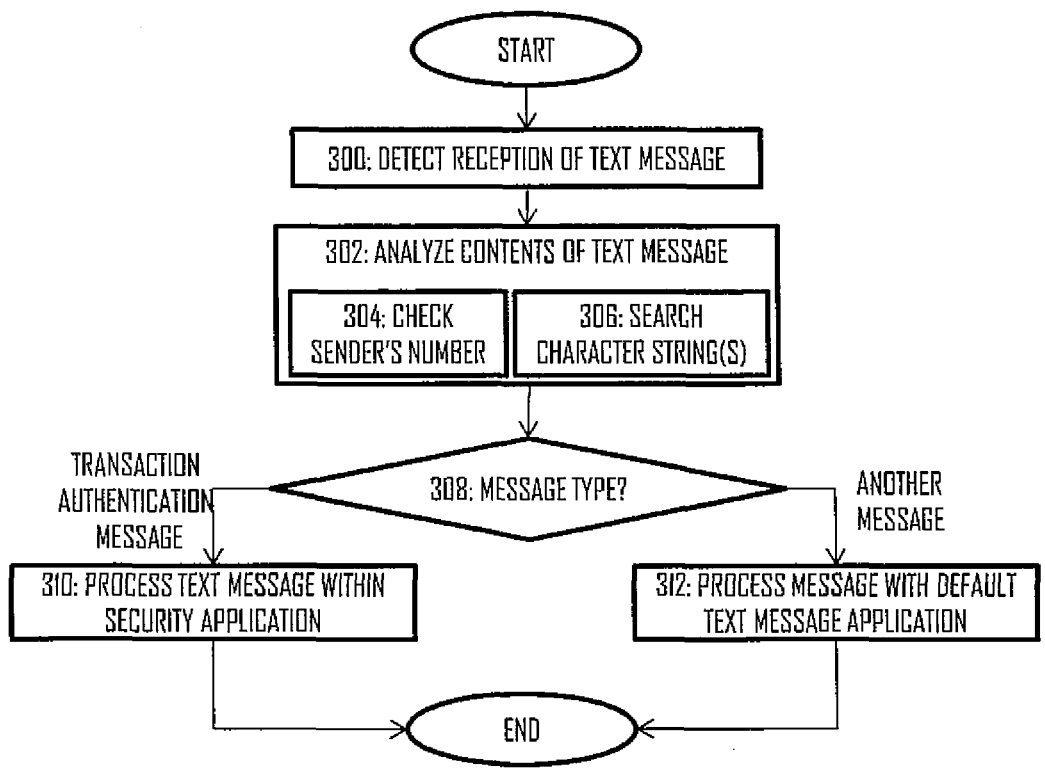
FIGS. 3 and 4 illustrate embodiments of FIG. 2.

Let us now consider an embodiment of the process of FIG. 2 with reference to FIG. 3. FIG. 3 may be considered as an embodiment of blocks 204 and 206. An initial situation in the process of FIG. 3 may be that the security application is monitoring for the received text messages. In block 300, the security application detects reception of a text message in the mobile communication device. In block 302, the security application analyses the contents of the received text message in an effort to determine whether or not the text message is a transaction authentication message. Block 302 may comprise block 304 in which the security application compares a sender number with known sender numbers of entities that send the transaction authentication messages, e.g. the banks. The list of known such entities and their respective telephone numbers may be stored in a database in a memory unit of the mobile communication device, for example. If the sender number is found in the database, the security application may determine that the received text message is the transaction authentication message. Otherwise, the received message may be determined to be another type of text message. Block 302 may comprise block 306 in which the security application analyses contents of the text message, e.g. the text field of the text message. The security application may search for one or more character strings that are unique for the transaction authentication messages. The security application may have stored definitions for the unique character strings, and the character strings may be acquired directly from the entities such as the banks. The text field may comprise a unique character string that explicitly indicates that the text message is a transaction authentication message. In another embodiment, the security application may search for words defining the transaction authentication messages, e.g. "please verify payment of" or "please authorize payment of". In another embodiment, the security application may search the end of the text field for a name of the entity sending the message and compare the name with the known entities sending the transaction authentication messages. Other criteria for identifying the transaction authentication messages are equally possible and it should be appreciated that providing a low threshold for determining the received text message to be the transaction authentication message may not be a problem or inconvenience, because the text message is nevertheless displayed to the user. There is no additional burden when displaying a conventional text message in the secured environment.

With respect to the identification of the transaction authentication message, the security application may update the definitions of the transaction authentication messages. The security application may receive a notification from a network server managing the definitions, when new definitions are available. Alternatively, the security application may regularly check for new updates. Accordingly, the definitions used by the security application may be kept up-to-date even if the entities carrying out the transactions change the contents of the transaction authentication messages, their telephone numbers, and/or any other factors used in the identification of the transaction authentication messages.

In block 308, the security application makes the decision of the type of the received text message on the basis of the processing of block 302. If the received text message is determined to be the transaction authentication message, the process proceeds to block 310 in which the text message is processed within the security application and other applications (including a default text message application of the mobile communication device) are prevented from accessing the text message. Block 310 may comprise notifying the user of reception of the text message and displaying the contents of the text message to the user. On the other hand, if the received text message is determined to be another type of text message and not the transaction authentication message, the process proceeds to block 312 in which the security application releases the text message and allows other applications to access the text message. Accordingly, the text message may be processed within the default text message application of the mobile communication device. Other applications and/or the operating system accessing the received text messages may also now gain access to the received text message.

Figure 4:
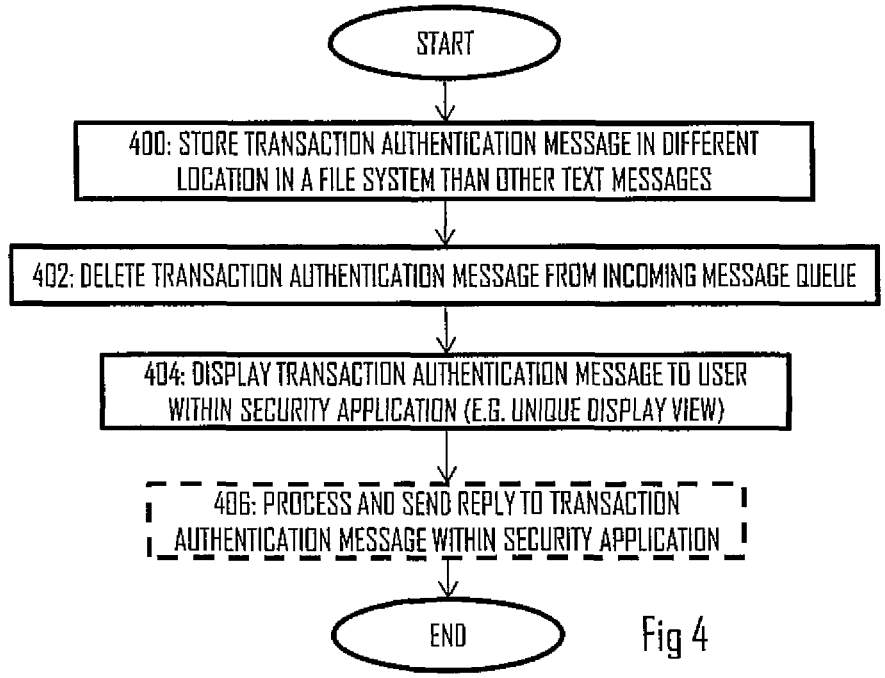

FIG. 4 illustrates a flow diagram of a method for processing the transaction authentication message within the secured environment of the security application. In particular, FIG. 4 illustrates some embodiments for providing the secured environment. FIG. 4 may be considered as an embodiment of block 206 and/or 310. Referring to FIG. 4, upon detecting the transaction authentication message, the security application may store the transaction authentication message in a special location in a file system of the mobile communication device. The special location may differ from the location to which conventional text messages are stored. This prevents malicious applications that scan the file locations of the received text messages from detecting the transaction authentication messages and, thus, improves the security of the environment in which the transaction authentication messages are processed.

In block 402, the security application deletes the transaction authentication message from a queue of received text messages. As a result, any other application processing the received text messages from the queue will not become aware of the transaction authentication message. Block 402 may be carried out after block 400.

In block 404, the transaction authentication message is output to the user within the secured environment provided by the security application. In an embodiment, the security application is fully self-sustained with respect to the user interfacing. This may be understood such that the security applications has its own functions and user interfacing tools for outputting the transaction authentication message and for receiving user inputs with respect to the processing of the transaction authentication message. The user inputs may comprise inputs for sending a reply to the transaction authentication message and/or deleting the transaction authentication message and, upon receiving a user input the security application may carry out the instructed operation. In block 404, the security application may display the transaction authentication message to the user within the security application by using only internal functions and instructions. The security application may use instructions of the operating system but, in some embodiments, the security application does not use any features or functions of the default text message processing application of the mobile communication device. As a consequence, if the default text message application is infected by malicious software, the malicious software cannot become aware of the transaction authentication message. This improves the security.

Figure 5A:
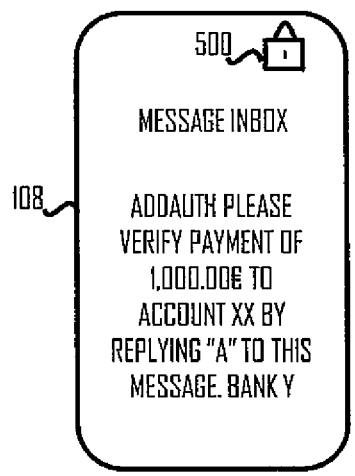
FIGS. 5A and 5B illustrate different display views associated with presenting received text messages according to some embodiments of the invention.
Figure 5B:
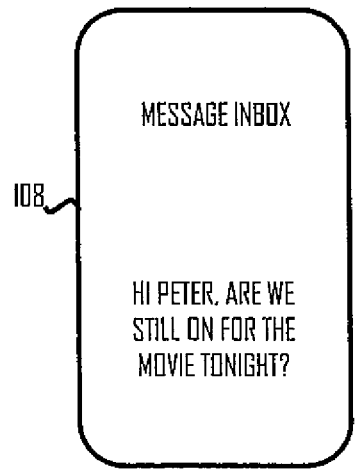

With respect to the display of the transaction authentication message in block 404, the security application may output the contents of the transaction authentication message in a display view that differs from the corresponding display view provided by the default text message application. This enables the user to see that the transaction authentication message is processed in the secured environment. FIG. 5A illustrates a simplified embodiment of a view that the security application may provide. FIG. 5B illustrates an example of the display view provided by the default text message application. The security application may display a specific display component 500 to indicate the secured environment that is not displayed by the default text message application. Alternatively, any other visual tools for indicating the different environment may be used to indicate the secured environment, e.g. a textual display noting that the processing is currently in the secured environment.

FIG. 5A also illustrates some examples of the contents of the transaction authentication message that may be used by the security application to identify the transaction authentication message in block 306. The transaction authentication message may comprise a specific character string that is an abbreviation or as alone does not provide any information to the user, e.g. "addauth" may be an abbreviation of "additional authentication". The transaction authentication message may comprise the name of the entity requesting for the authentication and carrying out the transaction, e.g. the name of the bank, which may be used by the security application in the identification.

Referring now back to FIG. 4, any further processing of the transaction authentication message may be carried out within the security application. For example, if the mobile authentication requires reply to the received transaction authentication message with a certain text message, the security application may be provided with features for editing and sending text messages. These may use the functions of the security application and the operating system, and the editing and the sending may be carried out without using any functions of the default text message application. The processing and sending of the reply text message is carried out in block 406.

Figure 6:
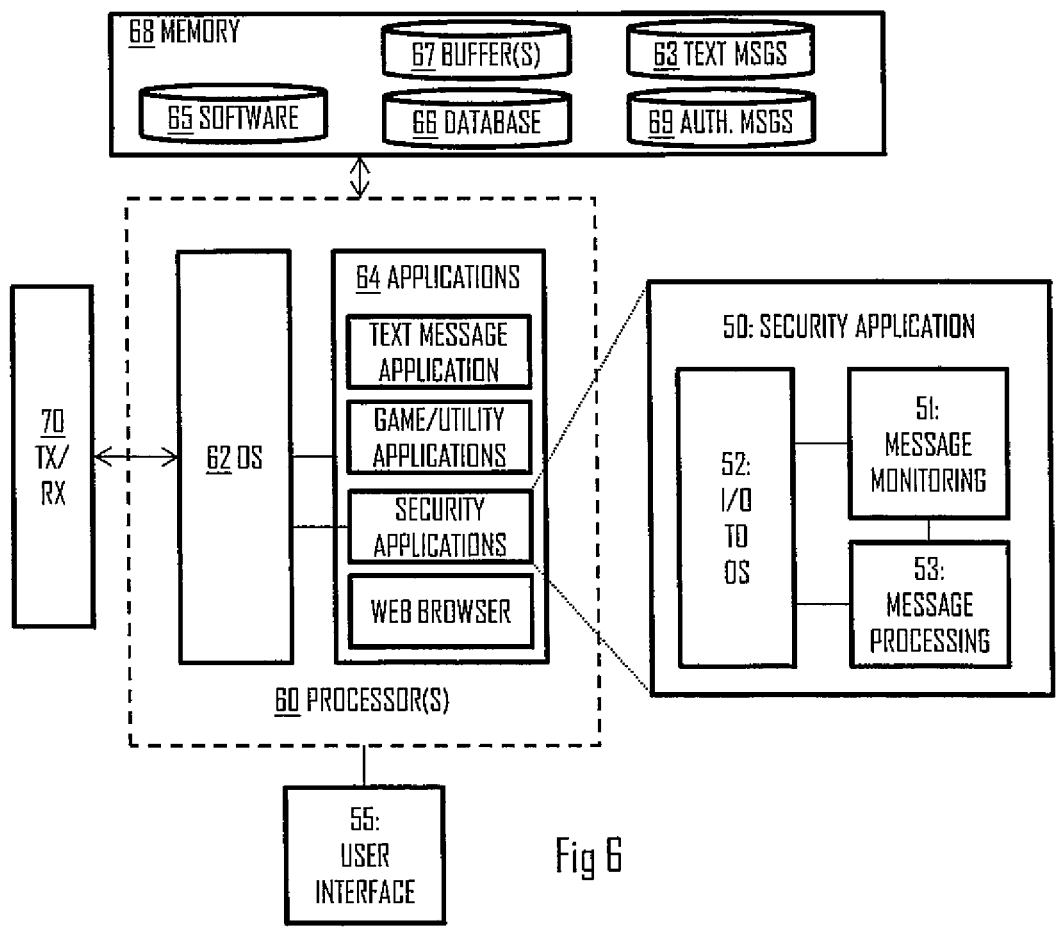
FIG. 6 illustrates a block diagram of an apparatus according to an embodiment of the invention.

An embodiment provides an apparatus comprising at least one processor and at least one memory including a computer program code, wherein the at least one memory and the computer program code are configured, with the at least one processor, to cause the apparatus to carry out any one of the embodiments described above with reference to FIGS. 2 to 5B. FIG. 6 illustrates a block diagram of an embodiment of such an apparatus for carrying out the embodiments. The apparatus may be comprised in the mobile communication device 108, and the apparatus may comprise a processing system configured or arranged to carry out security functions. In an embodiment, the apparatus is the mobile communication device 108. The processing system may comprise said at least one processor 60 and at least one memory 68 including a computer program code 65, wherein the at least one memory 68 and the computer program code 65 are configured, with the at least one processor 60, to cause the apparatus to carry out the above-described embodiments.

The processing system may refer to any one of the following: (a) a hardware-only circuit implementation such as an implementation in only analogue and/or digital circuitry; (b) a combination of hardware circuitry and software and/or firmware, such as (as applicable): (i) a combination of processor(s) or processor cores; or (ii) portions of processor(s)/software including digital signal processor(s), software, and at least one memory that work together to cause the apparatus to perform specific functions; and (c) circuits, such as a microprocessor(s) or a portion of a microprocessor(s), that require software or firmware for operation, even if the software or firmware is not physically present. The processing system may also cover an implementation of merely a processor (or multiple processors) or portion of a processor, e.g. one or multiple cores of a multi-core processor, and its (or their) accompanying software and/or firmware. The term processing system would also cover, for example, an integrated circuit, an application-specific integrated circuit (ASIC), and/or a field-programmable grid array (FPGA) circuit for the apparatus according to an embodiment of the invention.

Referring to FIG. 6, the processor 60 may be configured to execute an operating system (OS) 62 of the mobile communication device 108. The operating system 62 may be any one of the above-described operating systems or any other operating system designed for mobile communication devices. As known in the art, the operating system 62 manages computer hardware resources, e.g. the processor(s) 60 and provides services to applications 64 executed in the mobile communication device 108. The applications 64 may comprise any known computer program applications including at least the above-mentioned text message application and the security application. It should be appreciated that the security application may be dedicated to securing the transaction authentications, or the security application may be a module of a more generic online security application, e.g. an anti-virus application. Additionally, the applications 64 may comprise game and/or utility applications, office applications, professional applications related to any professional field, a web browser, etc. The apparatus may further comprise or be connected to a communication interface 70 comprising hardware and/or software for realizing a communication connectivity according to one or more communication protocols. At least some of the communication protocols may comprise radio communication protocols, e.g. Global System for Mobile Communications (GSM), Universal Mobile Telecommunication System or any one of its evolution versions (LTE, LTE-Advanced), IEEE 802.11 (Wi-Fi), Bluetooth®, etc. The operating system 62 may configure the communication interface 70 to provide a connection to the mobile communication network 106 and, in some embodiments, to the Internet 102. The communication interface 70 under the control of the operating system 62 may be used to communicate with the transaction authentication server 104.

The computer security applications executed in the mobile communication device may comprise an anti-virus engine, a firewall, a network traffic monitor, etc. for tracking any known attack vector to prevent a virus, worm, or malware from accessing the mobile communication device 108. The computer security applications may also provide the above-described functionality of the security application 50 used for securing online transaction authentications. Referring to FIG. 8, the security application 50 may comprise an input/output (I/O) interface 52 to communicate with the operating system 62. The I/O interface 52 may be called an application programming interface (API) and it enables the interaction and exchange of information between the operating system 62 and the security application 50. The security application may further comprise a message monitoring module 51 configured to monitor for the received text messages. When a new text message appears in a buffer 67 of received text messages, the operating system 62 may notify the security application 50 about the new text message in the buffer 67. The buffer may be a temporary memory location to which the received text messages are stored before any application processes them. As described above, the security application 50 may be arranged to be the first application to acquire knowledge of the received text message. Upon detecting the text message in the buffer, the message monitoring module 51 may activate a message processing module 53 of the security application.

The message processing module 53 may access the buffer 67 and acquire the received text message. Then, it may analyse the text message and determine whether or not the text message is the transaction authentication message. The message processing module 53 may utilize definitions of the transaction authentication messages stored in a definition database 66 in the memory 68. If the text message is determined not to be the transaction authentication message, the message processing module 53 may inform the operating system 62 that the operating system may pass the text message forward in the processing, e.g. by allowing the processing system to notify the next application in the order about the reception of the text message. On the other hand, if the message processing module 53 determines that the text message is the transaction authentication message, the message processing module 53 may move the text message from the buffer 67 to a file location 69 dedicated to the transaction authentication messages. This file location 69 is different from a file location 63 used for storing the other types of text messages. As a consequence, the transaction authentication message may not show in a conventional queue of received text messages displayed by the default text message application. Thereafter, the message processing application may notify the user about the reception of the transaction authentication message by outputting a visual and/or audible notification through a user interface 55 of the mobile communication device 108. The user interface 55 may comprise a display screen, a loudspeaker, and at least one input device such as keypad or a keyboard or a touch-sensitive display screen. The message processing module 53 may further carry out other processing of the transaction authentication message, as described above. Such processing may include displaying the contents of the transaction authentication message in the display screen, receiving user inputs instructing further processing and reply to the transaction authentication message, sending the reply message, etc.

The processes or methods described in FIGS. 2 to 5B may also be carried out in the form of a computer process defined by a computer program 65. The computer program 65 may be in source code form, object code form, or in some intermediate form, and it may be stored in some sort of carrier 68, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to mobile communication devices defined above but also to other suitable computing systems capable of receiving the transaction authentication messages. The protocols used in transferring the text messages and the specifications of communication systems develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:
1. A method comprising:
executing, in a mobile communication device, a security application configured to monitor received text messages of a short message service;

arranging, in the mobile communication device, the security application to have prioritized access to process the received text messages before other applications executed in the mobile communication device;

identifying, by the security application, in the mobile communication device from contents of a received text message, whether or not the received text message comprises a transaction authentication message;

upon detecting that the received text message comprises the transaction authentication message, preventing, by the security application, in the mobile communication device the processing of the transaction authentication message by the other applications and carrying out, by the security application, user interfacing related to the transaction authentication message within a secured environment provided by the security application.

2. The method of claim 1, wherein said preventing the processing of the transaction authentication message by the other applications comprises preventing a default messaging application of the mobile communication device from accessing the transaction authentication message.

3. The method of claim 1, wherein said user interfacing comprises displaying the transaction authentication message to a user via a user interface component executed within the security application.

4. The method of claim 1, wherein said secured environment is provided by storing the received transaction authentication message in a different location in a file system of the mobile communication device than that used for storing other received text messages.

5. The method of claim 4, wherein said secured environment is further provided by removing the received transaction authentication message from an incoming text message queue.

6. The method of claim 1, wherein said arranging the security application to have prioritized access to process the received text messages comprises providing the security application with the highest priority to process the received text messages in an installation phase of the security application.

7. The method of claim 1, wherein said arranging the security application to have prioritized access to process the received text messages comprises providing the security application with an application name that is first in an alphabetical order.

8. The method of claim 1, wherein said identifying comprises determining from a sender's telephone number whether or not the received text message comprises the transaction authentication message.

9. The method of claim 1, wherein said identifying comprises determining from at least one character string comprised in a text portion of the received text message whether or not the received text message comprises the transaction authentication message.

10. An apparatus comprising:
at least one processor; and
at least one memory including a computer program code, wherein the at least one memory and the computer program code are configured, with the at least one processor, to cause the apparatus to:
 execute a security application configured to monitor received text messages of a short message service;
 arrange the security application to have prioritized access to process the received text messages before other applications executed in the apparatus;
 identify, by the security application, from contents of a received text message whether or not the received text message comprises a transaction authentication message;
 upon detecting that the received text message comprises the transaction authentication message, prevent, by the security application, the processing of the transaction authentication message by the other applications and carry out, by the security application, user interfacing related to the transaction authentication message within a secured environment provided by the security application.

11. The apparatus of claim 10, wherein the at least one memory and the computer program code are configured, with the at least one processor, to cause the apparatus to prevent the processing of the transaction authentication message by the other applications by preventing a default messaging application of the apparatus from accessing the transaction authentication message.

12. The apparatus of claim 10, wherein the at least one memory and the computer program code are configured, with the at least one processor, to cause the apparatus to display the transaction authentication message to a user via a user interface component executed within the security application.

13. The apparatus of claim 10, wherein the at least one memory and the computer program code are configured, with the at least one processor, to cause the apparatus to provide said secured environment by storing the received transaction authentication message in a different location in a file system of the mobile communication device than that used for storing other received text messages.

14. The apparatus of claim 13, wherein the at least one memory and the computer program code are configured, with the at least one processor, to cause the apparatus to provide said secured environment by removing the received transaction authentication message from an incoming text message queue.

15. The apparatus of claim 10, wherein the at least one memory and the computer program code are configured, with the at least one processor, to cause the apparatus to arrange the security application to have prioritized access to process the received text messages by providing the security application with the highest priority to process the received text messages in an installation phase of the security application.

16. The apparatus of claim 10, wherein the at least one memory and the computer program code are configured, with the at least one processor, to cause the apparatus to arrange the security application to have prioritized access to process the received text messages by providing the security application with an application name that is first in an alphabetical order.

17. The apparatus of claim 10, wherein the at least one memory and the computer program code are configured, with the at least one processor, to cause the apparatus to determine from a sender's telephone number whether or not the received text message comprises the transaction authentication message.

18. The apparatus of claim 10, wherein the at least one memory and the computer program code are configured, with the at least one processor, to cause the apparatus to determine from at least one character string comprised in a text portion of the received text message whether or not the received text message comprises the transaction authentication message.

19. A computer program product embodied on a non-transitory distribution medium readable by a computer and comprising program instructions which, when loaded into the computer, execute a computer process comprising:
- executing a security application configured to monitor received text messages of a short message service;
- arranging the security application to have prioritized access to process the received text messages before other applications executed in the mobile communication device;
- identifying, by the security application, from contents of a received text message, whether or not the received text message comprises a transaction authentication message;
- upon detecting that the received text message comprises the transaction authentication message, preventing, by the security application, the processing of the transaction authentication message by the other applications and carrying out, by the security application, user interfacing related to the transaction authentication message within a secured environment provided by the security application.

* * * * *